Figure 1:
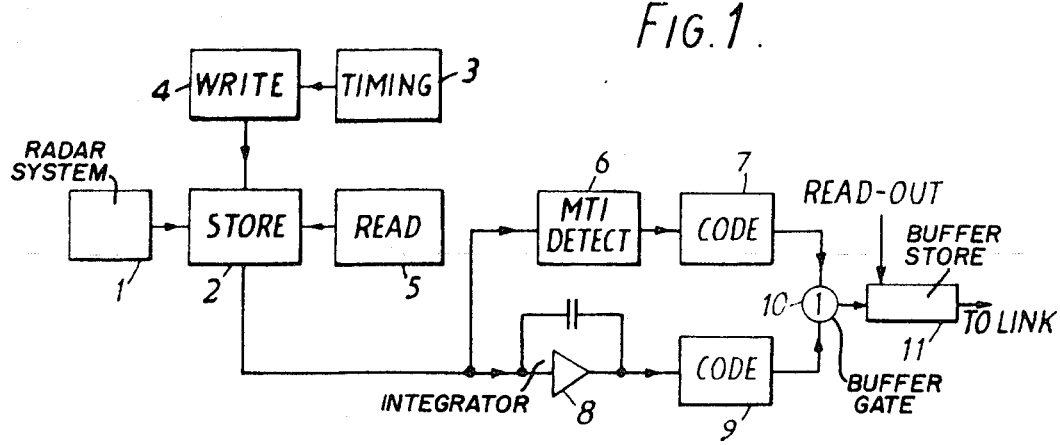

United States Patent [19]

Voles

[11] 3,745,570
[45] July 10, 1973

[54] IMPROVEMENTS RELATING TO MOVING TARGET INDICATING SYSTEMS
[75] Inventor: Roger Voles, London, England
[73] Assignee: EMI Limited, Hayes, Middlesex, England
[22] Filed: Apr. 1, 1970
[21] Appl. No.: 24,939

[30] Foreign Application Priority Data
Apr. 2, 1969 Great Britain.................. 17,251/69

[52] U.S. Cl................. 343/7.7, 343/5 SC, 343/6 A
[51] Int. Cl............................................. G01s 9/42
[58] Field of Search.................... 343/5 SC, 6 A, 7.7

[56] References Cited
UNITED STATES PATENTS
2,897,490    7/1959    Sunstein.......................... 343/6 A X
2,991,465    7/1961    McLucas ........................ 343/6 A X
3,080,556    3/1963    Breithaupt .................... 343/5 SC X Primary Examiner—T. H. Tubbesing
Attorney—Fleit, Gipple & Jacobson

[57] ABSTRACT

An arrangement is described for processing the signals derived from a radar system in such a way as to reduce the bandwidth of the data representative of such signals, and so enable transmission of data derived from the system over a data link without sacrifice in the detection capabilities of the system with respect to moving targets.

5 Claims, 3 Drawing Figures

IMPROVEMENTS RELATING TO MOVING TARGET INDICATING SYSTEMS

The present invention relates to moving target indicating systems and especially to such systems as employ radar pulses and are carried in aircraft.

It is desirable to transmit the information derived from such a radar system to a ground base for processing over a digital V.H.F. link, since such a link provides a long range performance from low altitude. However, the present equipments available to operate such a link have insufficient data band-widths to permit the on-line transmission of all the information which is derived from the radar system.

It is an object of the present invention to process the signals derived from the radar system in such a way as to reduce the bandwidth of the data representative of said signals and so enable transmission of data from said system over a digital VHF link without sacrifice in the detection capabilities of the system with respect to moving targets.

According to the present invention there is provided a moving target indicating system including means for transmitting and receiving radar pulses, means for storing signals containing target information derived from the received radar pulses, said signals being high resolution signals and relating to small portions of a scanned plan area, deriving means for deriving from said storage means high resolution signals relating to portions of the plan area larger than said small portions and for producing therefrom signals representing moving target information, means for integrating the high resolution signals derived from said storage means so as to produce lower resolution signals, and merging means for merging said signals representing moving target information with said lower resolution signals to produce a composite signal for transmission over a data link.

Figure 2:
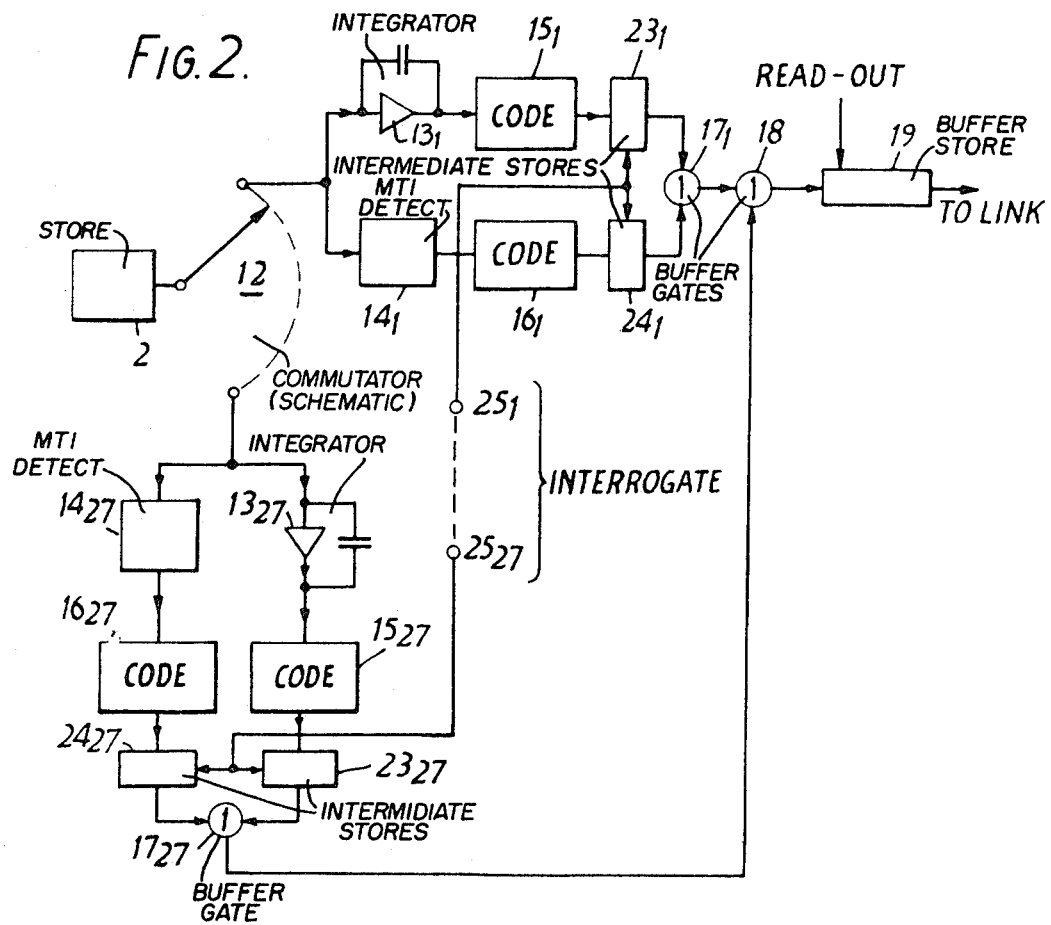
Figure 3:
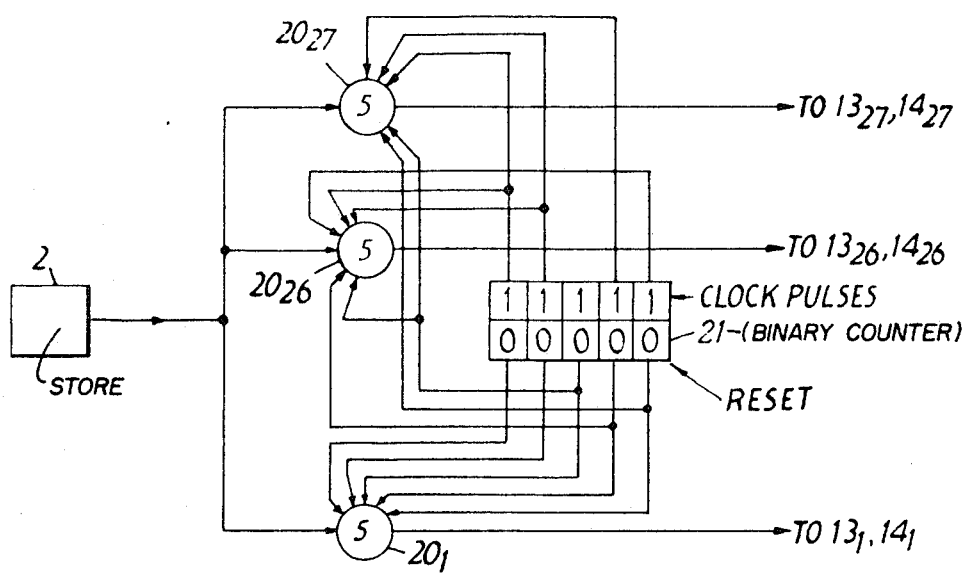

In order that the invention may be clearly understood and readily carried into effect, it will now be described with reference to the accompanying drawings of which:

FIG. 1 represents, in block diagrammatic form, a moving target indicating system according to one example of the invention, FIG. 2 represents an alternative system according to the invention, and FIG. 3 shows in part a gating circuit suitable for use with the arrangement of FIG. 2.

The on-line transmission of moving target indicator (or briefly M.T.I.) data and map breakthrough data derived from relatively small, high resolution plan cells in a plan area, scanned by means of radar pulses, over a digital, V.H.F. data link requires that the amount of data representing information derived from said area is reduced before transmission over said link. In accordance with the present invention, the low level map breakthrough data is digitally coded, so as to be compressed into a first number of non-uniform amplitude bands and the M.T.I. data is likewise compressed into a second number of amplitude bands spread across the rest of the dynamic range of the output. In the present example, said first and second numbers of amplitude bands are both equal to four, and therefore three binary bits are required for representing the output derived from each cell. This leads to a bit capacity requirement for said data link in excess of that obtainable with existing equipments. Thus, in order to reduce the required bit capacity, the linear resolution of said system is reduced, in both the along-track and across-track directions, after the detection of the moving targets. By this means, the detectability of moving targets is unchanged, but the plan resolution of moving target and map breakthrough data is reduced. In the present example, the resolution reduction factor is three in both the across-track and along-track directions, so that low resolution plan cells, of nine times the area of the high resolution plan cells are delineated in the scanned area.

Referring now to FIG. 1, the high resolution data derived from the radar system 1 may be applied to a storage tube 2 in the cockpit of the aircraft carrying the radar, the information being deposited on the charge area of said tube under the control of writing circuits 4. The storage tube 2 preferably includes a display facility, so that the high resolution information is available in visual form in the cockpit. Alternative or additional cockpit displays may, however, be provided.

The information is derived from the charge area of tube 2, under the influence of reading circuit 5, and both circuits 4 and 5 are controlled by a master timing circuit 3.

The reduction in resolution may be achieved by arranging the reading circuits 5 to execute a sub-scan corresponding to the area of a low resolution plan cell, but with the full reading resolution, which corresponds to the radar resolution. For example, if high resolution information deposited on the charge area occupies a portion of the charge area proportional to the high resolution plan cells in the scanned area, the reading beam is arranged to scan in succession, sets of $m$ such portions, where $m$ is the resolution reduction factor (nine in this example). Thus the information is derived from the charge area in the form of several discrete trains of high resolution signals, the train length being dependent upon the size of the low resolution plan cells in the scanned area, and thus upon the reduction factor $m$. The sub-scan may be, for example a spiral or is preferably a gated sawtooth. In either case, the gain prior to integration may be controlled to de-weight the data progressively away from the center of each cell and thereby to produce a more faithful band-width compression. The instantaneous (high resolution) output is monitored continuously in circuit 6 to detect the presence of moving targets and if any are detected, peak clamping and digital coding circuit 7 ensures that the level of the largest determines the digital output from that cell. The high resolution output is also arranged to drive an integrator 8 which has a time constant matched to the sub-scan period, that is the time taken to scan the information derived from one low resolution plane cell. The integrator output is digitized in coding circuit 9 and represents the output from that cell whenever no moving target is detected in it. The outputs representing the M.T.I. and map breakthrough data from circuits 7 and 9 respectively are applied via a buffer gate 10 to a buffer store 11, which may comprise a shift register. The link is fed by the output of store 11.

One way of utilizing the signals derived from such a subscan is to read out the information derived from a number $n$ of low resolution cells between each frame of information read-out to a T.V. type of cockpit display, the number $n$ being the ratio of the number of low resolution cells to be digitized per second to the number of half fields read out per second, and in one example this number is fourteen. The bits of information relating to the $n$ cells may be fed into a shift register 11 whence readout to the link occurs.

A second way of deriving the information from the storage tube 2 is shown in FIG. 2, the T.V. readout in this case being non interlaced. Data from the appropriate number of adjacent lines of the scan (three in this example) is gated by means shown schematically as a rotating switch 12 into a number of analogue integrators 13, each of the integrator circuits being connected in parallel with a corresponding peak clamping circuit 14. In one example, 27 such pairs of circuits are employed. During each frame, each of the 27 pairs of circuits are addressed three times in order to apply thereto the three portions of information per cell. The signal portions are digitized in circuits 15 and 16 respectively, and stored in intermediate stores 23, 24 respectively, the output of a respective peak detector circuit signifying the presence or otherwise of a moving target in a particular cell and providing the output therefrom when such a moving target is detected therein. After the information derived from three TV lines has been applied to the pairs of circuits, the intermediate stores are interrogated in turn by application of interrogating signals in succession to terminals $25_1 \ldots 25_{27}$. The data from stores 23 and 24 is merged via buffer 17, so that the M.T.I. data over-writes the map breakthrough data. The bits so produced are dumped via buffer 18 into a suitable buffer store 19 prior to being read-out over the data link. The edges of each cell may again be de-weighted, but this is not essential. Although the gating means has been represented schematically by the rotary switch 12, a practical gating device may comprise, for example, a series of $p$ gates 20, each requiring $q$ inputs to enable it. The enabling inputs may be derived from a $q$ position binary counter 21 which is arranged to count up to $p$ once per scanning line. The signal from storage tube 2 is applied in parallel to each of the $p$ gates, and the output of each gate is connected to a respective pair of circuits 13, 14. Thus, in the present example, where $p$ is equal to 27, $q$ is equal to five and the arrangement may be as shown in part in FIG. 3, only three of the 27 gates, numbers 1, 26 and 27, being shown for clarity.

In an alternative method of achieving the reduction in resolution, the reading circuit initially scans off the information derived from the scanned area with full resolution and is arranged to note the presence and coarse amplitude of all moving targets. The resolution of the reading beam is then reduced by the reduction factor and the same information scanned again, the level in each element then being digitized. The two sets of digital data are then merged with the rule that the high resolution data over-writes the low resolution data.

The high resolution M.T.I. data can be further coded and read out at convenient times to indicate the number of moving targets in a cell. This information is provided in addition to the basic M.T.I. and map breakthrough data.

What I claim is:

1. A moving target indicating system including means for transmitting and receiving radar pulses, storage means for storing signals containing target information derived from the received radar pulses, said signals being high resolution signals and relating to small portions of a scanned plan area, deriving means for deriving from said storage means high resolution signals relating to portions of the plan area larger than said small portions and for producing therefrom signals representing moving target information, means for integrating the high resolution signals derived from said storage means so as to produce lower resolution signals, and merging means for merging said signals representing moving target information with said lower resolution signals to produce a composite signal for transmission over a data link.

2. A system according to claim 1 wherein said storage means comprises a storage tube.

3. A system according to claim 2 wherein said deriving means includes reading circuit means adapted to cause scansion of the storage target of said tube so as to derive said high resolution signals therefrom in the form of signal trains of substantially equal durations, the durations of said train being determined by the dimensions of said larger portions of the scanned area.

4. A system according to claim 2 wherein said deriving means includes reading circuit means adapted to cause scansion of the storage target of said tube so as to derive therefrom said high resolution signals, relating to a given one of said larger portions of the plan area, in the form of several time-spaced parts and commutating means for directing each of said parts to a circuit arrangement indivudual to said given portion, said arrangement including two parallel channels, one of said channels including said means for producing said signals representing moving target information and the other of said channels including said means for integrating the high resolution signals so as to produce said lower resolution signals.

5. A system according to claim 1 in which said merging means includes respective digital coding means connected to receive said signals representing moving target information and said lower resolution signals and adapted to compress the amplitudes of the signals representing moving target information and the lower resolution signals into respective sets of levels and a buffer gate connected to receive as inputs the two sets of compressed signals and adapted to produce said composite signal.

* * * * *